US012687180B2

(12) United States Patent (10) Patent No.: US 12,687,180 B2
Williams et al. (45) Date of Patent: Jul. 21, 2026

(54) HYDRAULIC ACTUATOR

(71) Applicant: Airbus Operations Limited, Bristol (GB)

(72) Inventors: David Williams, Bristol (GB); Sean Kerr, Bristol (GB)

(73) Assignee: Airbus Operations Limited, Bristol (GB)

( * ) Notice: Subject to any disclaimer, the term of this patent is extended or adjusted under 35 U.S.C. 154(b) by 6 days.

(21) Appl. No.: 19/187,033

(22) Filed: Apr. 23, 2025

(65) Prior Publication Data

US 2025/0334134 A1 Oct. 30, 2025

(30) Foreign Application Priority Data

Apr. 24, 2024 (GB) ...................................... 2405771

(51) Int. Cl.
*B64C 25/22* (2006.01)
*F15B 11/024* (2006.01)
(52) U.S. Cl.
CPC ............ *F15B 11/024* (2013.01); *B64C 25/22* (2013.01); *F15B 2211/62* (2013.01)
(58) Field of Classification Search
CPC . F15B 11/024; F15B 11/0406; F15B 2211/62; B64C 25/22
See application file for complete search history.

(56) References Cited

U.S. PATENT DOCUMENTS

| | | | |
|---|---|---|---|
| 4,442,912 | A | 4/1984 | Vette |
| 6,186,043 | B1 | 2/2001 | Callies |
| 6,397,590 | B1 | 6/2002 | Hart |
| 10,816,019 | B2 | 10/2020 | Uhlman et al. |

(Continued)

FOREIGN PATENT DOCUMENTS

| | | |
|---|---|---|
| CN | 113833707 A | 12/2021 |
| CN | 215043641 U | 12/2021 |

(Continued)

OTHER PUBLICATIONS

United Kingdom Intellectual Property Office Combined Search and Examination Report in GB Application No. 2405771.3, dated Sep. 25, 2024, 7 pages.

(Continued)

*Primary Examiner* — Abiy Teka
(74) *Attorney, Agent, or Firm* — KDW Firm PLLC

(57) ABSTRACT

A hydraulic actuator for a hydraulic actuation system of an aircraft includes a housing defining a cavity, a piston dividing the cavity into extension and retraction chambers and movable relative to the housing to increase volume of one chamber and decrease volume of another of the chambers. A bypass includes first and second bypass ports and a connecting bypass line, and first and second chamber ports opening into the extension and retraction chambers at all positions of the piston relative to the housing for passage of hydraulic fluid. The first and second bypass ports open into one of the extension chamber and retraction chamber when the piston is at a first position relative to the housing so the first bypass port and the second bypass port open into respective ones of the extension chamber and the retraction chamber when the piston is at a second position relative to the housing.

20 Claims, 3 Drawing Sheets

(56)                References Cited

U.S. PATENT DOCUMENTS

| | | |
|---|---|---|
| 2014/0318652 A1 | 10/2014 | Sommer et al. |
| 2019/0071136 A1 | 3/2019 | Benevelli et al. |
| 2019/0186512 A1 | 6/2019 | Didey |

FOREIGN PATENT DOCUMENTS

| | | | | |
|---|---|---|---|---|
| DE | 102019008675 A1 | 7/2021 | | |
| EP | 0109462 A1 | 5/1984 | | |
| EP | 0200870 A2 * | 11/1986 | ............ | B62D 33/07 |
| EP | 0500982 A1 | 9/1992 | | |
| EP | 1435461 A1 | 7/2004 | | |
| EP | 2792890 A1 | 10/2014 | | |
| EP | 3882135 A1 | 9/2021 | | |
| FR | 2303976 A1 | 10/1976 | | |
| GB | 2079378 A | 1/1982 | | |
| GB | 2470499 A | 11/2010 | | |
| GB | 2586790 A | 3/2021 | | |
| JP | 2019157908 A | 9/2019 | | |
| WO | WO-0242146 A1 * | 5/2002 | .......... | B62D 33/067 |
| WO | 2011026458 A1 | 3/2011 | | |
| WO | 2021037829 A1 | 3/2021 | | |

OTHER PUBLICATIONS

Extended European Search Report in EP Application No. 25172059.5 dated Oct. 1, 2025, 11 pages.

* cited by examiner

HYDRAULIC ACTUATOR

TECHNICAL FIELD

The disclosure herein relates to hydraulic actuators for hydraulic actuation systems of aircraft, and particularly for landing gear systems of aircraft.

BACKGROUND

When an aircraft takes off from an airport, it needs to be able to achieve sufficient climb performance to clear any obstacles, such as a boundary fence and buildings, with sufficient margin. A factor that influences the climb performance is drag generated by landing gear of the aircraft. When a retractable landing gear is extended, as is the case during take-off, it generates a lot of drag and therefore reduces the ability of the aircraft to accelerate and climb. The length of time it takes to retract the landing gear influences the total drag and, therefore, the climb performance of the aircraft. Reducing the retraction time would reduce the total drag acting on the aircraft. It may additionally, or alternatively, allow an increase in maximum take-off weight of the aircraft for a given size of landing gear system, wing capability and engine thrust, while still enabling the aircraft to achieve sufficient climb performance. It is therefore desirable to retract the landing gear as soon as possible after take-off.

Many landing gear systems employ hydraulically actuated actuators to retract the landing gear. If the temperature of such an actuator drops, then so too does the temperature of hydraulic fluid that is used to actuate the actuator. This results in the hydraulic fluid becoming increasingly viscous, which increases its resistance to flow and, therefore, the time it takes to actuate the actuator. Accordingly, decreasing the temperature of the actuator can have a very significant impact on the time it takes to retract the landing gear and, therefore, the climb performance of the aircraft and/or the maximum take-off weight of the aircraft.

SUMMARY

A first aspect of the disclosure herein provides a hydraulic actuator for a hydraulic actuation system of an aircraft, the hydraulic actuator comprising: a housing defining a cavity configured to accommodate hydraulic fluid; a piston that divides the cavity into an extension chamber and a retraction chamber and that is movable relative to the housing such that a volume of one of the extension chamber and the retraction chamber is increased, and a volume of the other of the extension chamber and the retraction chamber is decreased, as the piston moves relative to the housing; a bypass comprising a first bypass port that opens into the cavity, a second bypass port that opens into the cavity, and a bypass line that fluidly connects the first bypass port to the second bypass port; and a first chamber port and a second chamber port that are discrete from the first bypass port and from the second bypass port, and that respectively open into the extension chamber and the retraction chamber at all positions of the piston relative to the housing for passage of hydraulic fluid between an exterior of the hydraulic actuator and the extension chamber and the retraction chamber, respectively; wherein the hydraulic actuator is configured so that both the first bypass port and the second bypass port open into one of the extension chamber and the retraction chamber when the piston is at a first position relative to the housing, and so that the first bypass port and the second bypass port open into respective ones of the extension chamber and the retraction chamber when the piston is at a second position relative to the housing.

The bypass provides a fluid flow path that bypasses the piston, and therefore provides a passive system for generating hydraulic flow through the hydraulic actuator, when the piston is at the second position. This may help to flush the hydraulic actuator in use. It may additionally, or alternatively, help heat within portions of a volume of hydraulic fluid, which is used to move the piston, to be distributed through that volume of hydraulic fluid when the piston is at the second position. Within a hydraulic actuation system in which the hydraulic actuator is to be employed, such heat might be generated remotely from the hydraulic actuator, such as at a pump of the system. Such distribution of this heat may help to reduce a viscosity and a resistance to flow of the hydraulic fluid and, therefore, the time it takes to move the piston. Accordingly, the bypass may help to reduce degradation in performance of the hydraulic actuator when the hydraulic fluid and/or the hydraulic actuator is in a cold environment. Additionally, or alternatively, the bypass may provide the hydraulic actuator with a so-called "snubbing" function at the end of a stroke of the piston, to reduce mechanical impact loads experienced by the actuator and/or by components to which the housing and the piston are connected. The hydraulic actuator may reduce these mechanical impact loads by diverting hydraulic fluid flow through the bypass, thus reducing the pressure acting on the piston, as the piston reaches the second position.

That the first chamber port and the second chamber port are discrete from the first bypass port and from the second bypass port may enable flow of hydraulic fluid through the first chamber port and through the second chamber port during movement of the piston relative to the housing, irrespective of a state of the bypass, such as if the bypass is blocked. Additionally, or alternatively, it may enable each of these four ports to be independently appropriately sized for their respective purposes. For example, optionally, the first chamber port and/or the second chamber port is larger than either of the first bypass port and the second bypass port. This may enable a relatively high flow rate of hydraulic fluid through the first chamber port and/or the second chamber port during actuation of the hydraulic actuator, and a relatively low flow rate through the bypass. Still further, that the first chamber port and the second chamber port are discrete from the first bypass port and from the second bypass port may result in flow of the hydraulic fluid through both of the extension chamber and the retraction chamber, as well as through the bypass, when the piston is at the second position. This may result in a greater mixing or replenishment of hydraulic fluid in the cavity, and thus greater distribution of heat through the hydraulic fluid.

Optionally, the bypass comprises a one-way valve that is configured to permit fluid flow through the bypass line from the first bypass port to the second bypass port and to restrict (such as prevent) fluid flow through the bypass line from the second bypass port to the first bypass port. The bypass may therefore be effective as a bypass only for a subset of possible positions of the piston relative to the housing, such as just the second position. Further optionally, the piston is closer to an end of the cavity when the piston is at the second position than when the piston is at the first position, and the second bypass port is closer than the first bypass port to the end of the cavity. As a result, when the hydraulic fluid is to drive the piston back towards the first position from the second position, the one-way valve restricts flow of hydraulic fluid through the bypass line, and thus a greater proportion of the hydraulic fluid may act on the piston than pass through the bypass. Indeed, when the one-way valve is configured to prevent fluid flow through the bypass line from the second bypass port to the first bypass port, operation of the hydraulic actuator to drive the piston back towards the first position from the second position would be as if the bypass were not present. This may improve an efficiency of the hydraulic actuator and/or reduce a time it takes to move the piston from the second position to the first position.

Optionally, at least a portion of the bypass line has an open cross-sectional area of between 0.5 mm$^2$ and 14 mm$^2$, such as between 1 mm$^2$ and 8 mm$^2$ or between 2 mm$^2$ and 5 mm$^2$. Flow of the hydraulic fluid through the portion of the bypass line may generate heat in the hydraulic fluid and its surroundings. Therefore, as the hydraulic fluid flows through the portion of the bypass line, the hydraulic fluid and its surroundings may increase in temperature. This may reduce the viscosity of the hydraulic fluid so that it flows more readily, and thus reduce the time it takes to subsequently actuate the hydraulic actuator using the hydraulic fluid. At least for the types of hydraulic fluids that are certified for use in aircraft hydraulic actuation systems, an open cross-sectional area within this range would result in flow of hydraulic fluid through the portion of the bypass line generating enough heat within a time period that is compatible with the needs of the hydraulic actuator and/or an aircraft in which it is to be implemented. Such a time period may be less than or equal to a turnaround time of the aircraft between flights. Further optionally, the portion of the bypass line comprises a flow restrictor that is configured to restrict a rate of fluid flow through the bypass line. The flow restrictor may, for example, be a flow restrictor valve or flow control valve. Optionally, the flow restrictor is in series with the one-way valve discussed above, when both are provided. In some examples, the bypass line is free from a one-way valve (i.e., there is no one-way valve in the bypass line). In some such examples, the bypass line is configured with an open cross-sectional area that is low enough to create a pressure differential between the first and second bypass ports that is sufficient to resist gross movement of fluid through the bypass line.

Optionally, a majority, or all, of the bypass line has an open cross-sectional area of between 0.5 mm$^2$ and 14 mm$^2$, such as between 1 mm$^2$ and 8 mm$^2$ or between 2 mm$^2$ and 5 mm$^2$. A dedicated flow restrictor within the bypass line may then not be needed, thus making construction cheaper and simpler.

Depending on the application of the hydraulic actuator, the piston may be likely to remain at the second position for longer than it would be at a position part way along its range of motion. Optionally, the second position of the piston is at a second end of the range of motion of the piston. When the hydraulic actuator is to be used in a landing gear system, the passive system provided by the bypass for generating hydraulic flow through the hydraulic actuator may be effective for longer periods of time, in use, when the second position is at the second end of the range of motion of the piston. Further optionally, the first position of the piston is at a first end of a range of motion of the piston relative to the housing, the first end opposite to the second end. In other examples, the second position of the piston may be midway along the range of motion of the piston. In, for example, cases when the hydraulic actuator is to be used in a steering system, it might be that the piston would be at such a midrange position for a majority of its life, in use.

Optionally, the hydraulic actuator is configured so that the piston is at the first position when the hydraulic actuator is fully contracted, and the piston is at the second position when the hydraulic actuator is fully extended. Accordingly, the bypass fluidly connects the extension chamber to the retraction chamber when the hydraulic actuator is fully extended. This may be advantageous in, for example, a hydraulic actuator that is to be used in a landing gear system in which the hydraulic actuator is to be, or is positionable to be, fully extended when the aircraft is on the ground. For example, full extension of the actuator may deploy a landing gear or open a landing gear bay door. With regard to the latter option, during cold weather operation, ground crew or a controller may cause the hydraulic actuator to fully extend to open the landing gear bay door, to enable hydraulic fluid to flow through the bypass.

Optionally, the first chamber port, the second chamber port, the first bypass port, and the second bypass port are the only ports that open into the cavity. This may simplify construction and manufacture of the hydraulic actuator, as compared to a hydraulic actuator with additional ports that open into the cavity.

Optionally, the hydraulic actuator is a double-acting hydraulic actuator. Accordingly, the hydraulic actuator is configured so that the piston is movable in a first direction relative to the housing by a resultant force on the piston arising due to a pressure of hydraulic fluid in the extension chamber being greater than a pressure of hydraulic fluid in the retraction chamber, and movable in a second direction relative to the housing by a resultant force on the piston arising due to a pressure of hydraulic fluid in the retraction chamber being greater than a pressure of hydraulic fluid in the extension chamber. This is in contrast to a single-acting hydraulic actuator, which would use one or more springs, rather than a difference in hydraulic pressure on opposite sides of the piston, to move the piston in one of its two possible directions. As compared to such a single-acting hydraulic actuator, a double-acting hydraulic actuator may be simpler, more durable and/or cheaper to manufacture.

Optionally, the hydraulic actuator is configured so that the bypass line is fluidly connected to the cavity by only the first bypass port and the second bypass port. Flow of hydraulic fluid through the bypass line is therefore possible only via the first bypass port and the second bypass port. This may simplify construction and/or operation of the bypass, and the overall hydraulic actuator.

Optionally, the bypass line is free from any junction with any other flow path. This may increase efficiency of operation of the hydraulic actuator, for example by reducing a chance of leakage of hydraulic fluid from the bypass line and/or helping to ensure that more of the hydraulic fluid in the cavity, in use, acts on the piston when the piston is to be driven from the first position or from the second position.

Optionally, the piston is free from any passage or passages therethrough, such as one or more passages that fluidically connect a circumferential side of the piston with one or other of the extension chamber and the retraction chamber. The piston may therefore be simpler, more durable and/or cheaper to manufacture.

Optionally, the hydraulic actuator comprises a second bypass, the second bypass comprising a third bypass port that opens into the cavity, a fourth bypass port that opens into the cavity, and a second bypass line that fluidly connects the third bypass port to the fourth bypass port; wherein the first chamber port, the second chamber port, the first bypass port and the second bypass port are discrete from the third bypass port and from the fourth bypass port; and wherein the hydraulic actuator is configured so that both the third bypass port and the fourth bypass port open into one of the extension chamber and the retraction chamber when the piston is at the second position relative to the housing, and so that the third bypass port and the fourth bypass port open into respective ones of the extension chamber and the retraction chamber when the piston is at the first position relative to the housing. The second bypass provides a second fluid flow path that bypasses the piston, and therefore provides a passive system for generating hydraulic flow through the hydraulic actuator, when the piston is at the first position.

Optionally, the second bypass comprises a second one-way valve that is configured to permit fluid flow through the second bypass line from the third bypass port to the fourth bypass port and to restrict (such as prevent) fluid flow through the second bypass line from the fourth bypass port to the third bypass port. The second bypass may therefore be effective as a bypass only for a subset of possible positions of the piston relative to the housing, such as just the first position. Further optionally, the piston is further from the end of the cavity when the piston is at the first position than when the piston is at the second position, and the third bypass port is closer than the fourth bypass port to the end of the cavity. As a result, when the hydraulic fluid is to drive the piston back towards the second position from the first position, the second one-way valve restricts flow of hydraulic fluid through the second bypass line, and thus a greater proportion of the hydraulic fluid may act on the piston than pass through the second bypass. Indeed, when the second one-way valve is configured to prevent fluid flow through the second bypass line from the fourth bypass port to the third bypass port, operation of the hydraulic actuator to drive the piston back towards the second position from the first position would be as if the second bypass were not present. This may improve an efficiency of the hydraulic actuator and/or reduce a time it takes to move the piston from the first position to the second position.

Optionally, the second bypass has any or all of the optional features of the bypass described herein.

Optionally, the first chamber port, the second chamber port, the first bypass port, the second bypass port, the third bypass port, and the fourth bypass port are the only ports that open into the cavity.

A second aspect of the disclosure herein provides a hydraulic actuation system for an aircraft, the hydraulic actuation system comprising: the hydraulic actuator of the first aspect for moving a load; a first hydraulic line fluidly connected to the first chamber port and configured to carry hydraulic fluid to or from the extension chamber; and a second hydraulic line fluidly connected to the second chamber port and configured to carry hydraulic fluid to or from the retraction chamber.

The bypass may create a return path when the piston is at the second position. This may help heat within portions of a volume of hydraulic fluid in the hydraulic actuation system to be distributed through the hydraulic actuation system. In some examples, other than for the bypass of the hydraulic actuator, the hydraulic actuation system may be a "dead-end" system, in which there is no fluid circulation and instead there are one or more bodies of hydraulic fluid in the system that merely move back and forth during operation of the system. In such a system, the bypass may be particularly beneficial for reducing degradation in performance of the hydraulic actuation system when the hydraulic fluid is in a cold environment.

Optionally, the first hydraulic line is free from any flow restrictor that is configured to restrict a rate of fluid flow through the first hydraulic line. Accordingly, hydraulic fluid may be delivered to and/or from the extension chamber without hinderance, which may therefore enable relative fast movement of the piston.

Optionally, the second hydraulic line is free from any flow restrictor that is configured to restrict a rate of fluid flow through the second hydraulic line. Accordingly, hydraulic fluid may be delivered to and/or from the restriction chamber without hinderance, which may therefore enable relative fast movement of the piston.

Optionally, the first hydraulic line and/or the second line is configured for two-way fluid flow. For example, the first hydraulic line and/or the second line may be free from any one-way valve. This may simplify the hydraulic actuation system and/or make it more lightweight, which is beneficial in the context of aircraft.

Optionally, the hydraulic actuation system is a landing gear system, such as a landing gear extension and retraction system (LGERS). In some such examples, the hydraulic actuator is for retracting and/or extending a landing gear. In other examples, the hydraulic actuator may be for opening and/or closing a landing gear bay door that covers a landing gear bay into which the landing gear is retractable. Accordingly, provision of the hydraulic actuator may enable the landing gear system to be operable sufficiently well in low operating temperatures.

Optionally, the hydraulic actuation system is a steering system.

A third aspect of the disclosure herein provides an aircraft comprising the hydraulic actuation system of the second aspect.

The hydraulic actuator of the first aspect of the disclosure herein may be supplied in isolation. That is, it may be supplied without any other parts of a hydraulic actuation system. The hydraulic actuation system of the second aspect of the disclosure herein may be supplied in isolation. That is, it may be supplied without any other parts of an aircraft.

Optional features of any one of the aspects of the disclosure herein may be applied equally to any other one of the aspects of the disclosure herein, where appropriate.

BRIEF DESCRIPTION OF THE DRAWINGS

Embodiments of the disclosure herein will now be described, by way of example only, with reference to the accompanying drawings, in which.

DETAILED DESCRIPTION

Figure 1:
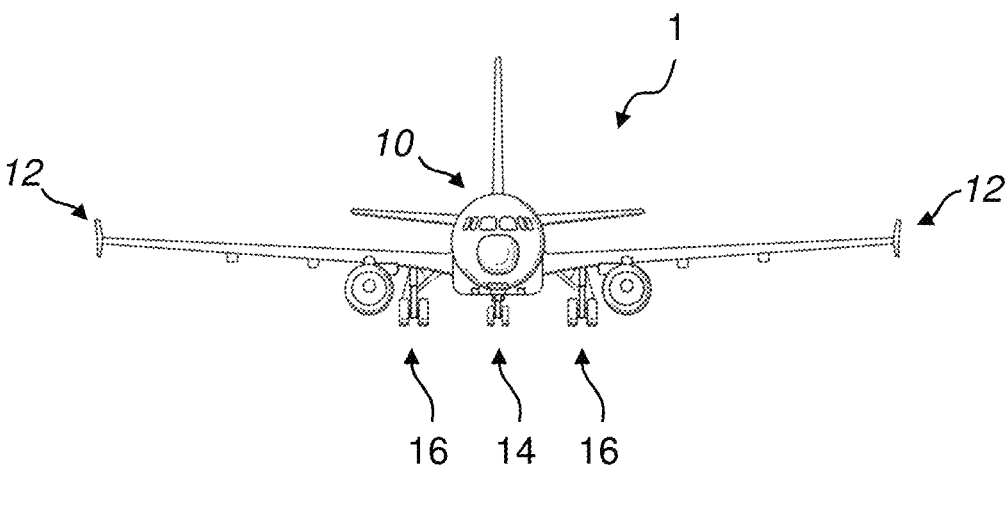
FIG. 1 shows a schematic front view of an aircraft.
Figure 2:
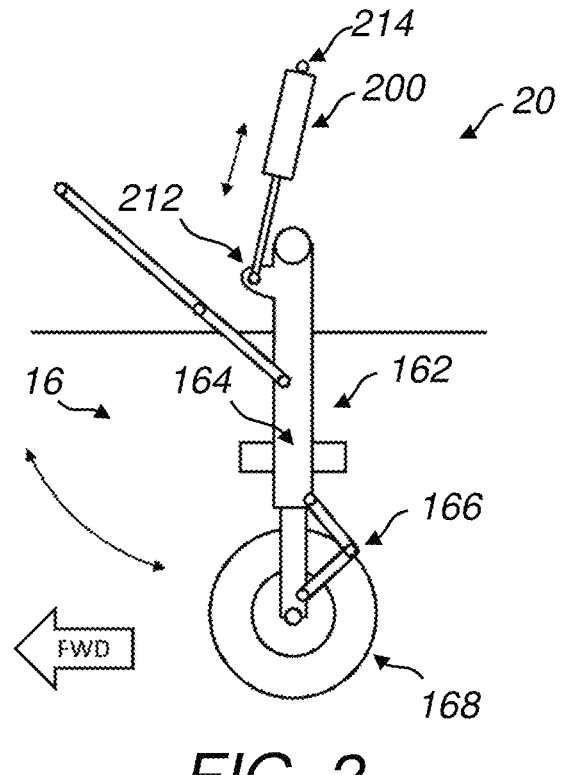
FIG. 2 shows a schematic side view of a landing gear of the aircraft of FIG. 1.

The aircraft 1 shown in FIG. 1 has a fuselage 10, a pair of wings 12 extending from the fuselage 10, a nose landing gear 14 mounted on the fuselage 10, and two main landing gears 16 mounted on the respective wings 12. One of the main landing gears 16 is shown in FIG. 2. The main landing gear 16 comprises a landing gear leg 162 comprising a shock absorber 164 and a torque link 166. A set of wheels 168 is mounted to a bottom distal end of the leg 162. In some other embodiments, the main landing gear 16 comprises a bogie pivotally mounted to the landing gear leg 162 and a plurality of sets of wheels mounted to the bogie.

Figure 3:
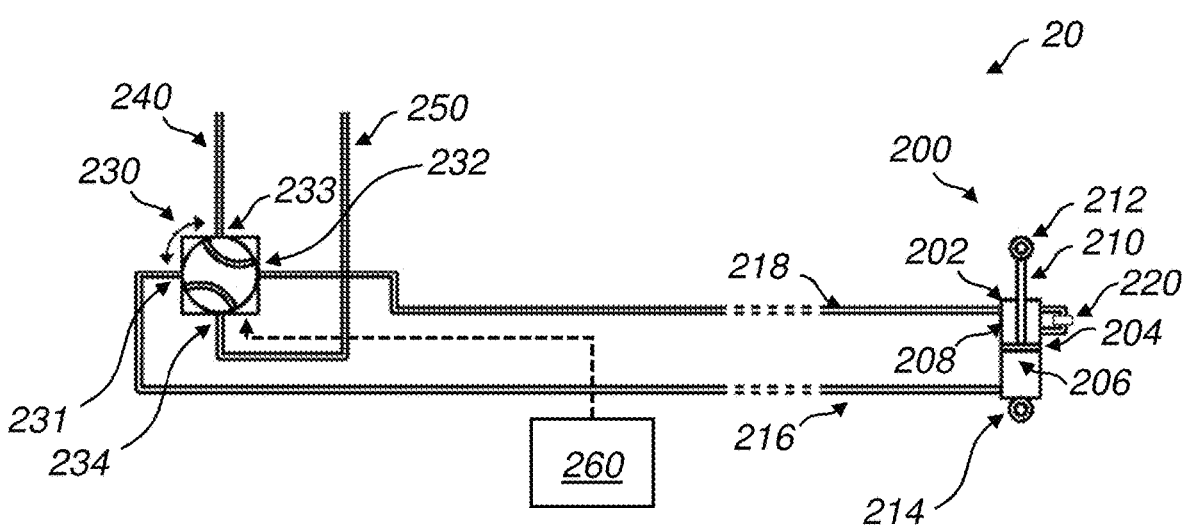
FIG. 3 shows a schematic diagram of part of a landing gear extension and retraction system of the aircraft of FIG. 1.

The aircraft 1 has a hydraulic actuation system, in the form of a landing gear system, 20 coupled to the main landing gear 16. The landing gear system 20 is a landing gear extension and retraction system (LGERS), since it is for both extending and retracting the main landing gear 16. The LGERS 20 comprises various components including a double-acting hydraulic actuator 200 (hereinafter called "the actuator 200") that acts to extend and retract the main landing gear 16. The LGERS 20 also includes a landing gear bay door actuator (not shown), as well as a landing gear up-lock mechanism (not shown) and a landing gear down-lock mechanism (not shown), which include their own hydraulic actuators (not shown) as would be known to the skilled reader. Part of the LGERS 20, including the actuator 200, is shown in the schematic diagram of FIG. 3.

The actuator 200 has a cylindrical housing 202 that is sealed and defines a cavity that is able to accommodate hydraulic fluid for actuating the actuator 200. Movably located within the housing 202 is a piston 204 of the actuator 200. The housing 202 defines and encircles an extension chamber 206 and a retraction chamber 208 on respective sides of the piston 204. The piston 204 is a movable separator that divides the cavity into the extension chamber 206 and the retraction chamber 208. The piston 204 is movable relative to the housing 202 such that a volume of one of the extension chamber 206 and the retraction chamber 208 is increased, and a volume of the other of the extension chamber 206 and the retraction chamber 208 is decreased, as the piston 204 moves relative to the housing 202. The piston 204 is attached to a piston rod 210, a free end 212 of which is pivotally mounted to the leg 162 of the main landing gear 16. An end 214 of the housing 202 that is distal from the free end 212 of the piston rod 210 is pivotally mounted to a fixed structural part (not shown) of the aircraft 1. The actuator 200 is described in more detail below.

The LGERS 20 further has a first hydraulic line 216, which is fluidically connected to the extension chamber 206, and a second hydraulic line 218, which is fluidically connected to the retraction chamber 208. The first and second hydraulic lines 216, 218 are connected at their respective opposite ends to respective first and second ports 231, 232 of a selector valve 230 of the LGERS and are both usable to transport hydraulic fluid towards and away from the actuator 200. The selector valve 230 has third and fourth ports 233, 234 that are respectively fluidly connected to a supply line 240 and a return line 250 of the LGERS 20. The LGERS 20 has a hydraulic fluid reservoir (not shown) that is fluidically connected to both the supply line 240 and the return line 250. A pump (not shown) is included in the supply line 240 to draw hydraulic fluid from the reservoir and supply it to the selector valve 230 at a supply pressure. This pump would generate heat in the hydraulic fluid during operation of the pump.

The selector valve 230 has a first mode in which it places the first hydraulic line 216 into fluidic communication with the supply line 240 and places the second hydraulic line 218 into fluidic communication with the return line 250. The selector valve 230 has a second mode in which it places the first hydraulic line 216 into fluidic communication with the return line 250 and places the second hydraulic line 218 into fluidic communication with the supply line 240. The selector valve 230 also has a third mode in which it takes both the supply line 240 and the return line 250 out of fluidic communication with both the first and second hydraulic lines 216, 218. The selector valve 230 and the pump are communicatively connected to, and, in use, controlled by, a controller 260 of the LGERS 20. The controller 260 is programmed to command the selector valve 230 to move to a fixed number of discrete positions (three, in this case) corresponding to the modes of the selector valve 230. As a result, the selector valve 230 does not provide for proportional control of pressure of the hydraulic fluid delivered to the first and second hydraulic lines 216, 218.

The actuator 200 and the selector valve 230 are remote from each other. Lengths of the first and second hydraulic lines 216, 218 are such that a volume of hydraulic fluid contained in each of the first and second hydraulic lines 216, 218 is greater than a volume of hydraulic fluid contained in the respective chamber 206, 208 of the actuator 200 to which the first and second hydraulic lines 216, 218 are connected. Therefore, absent a bypass 220 of the actuator 200, which is described below, each of the first and second hydraulic lines 216, 218 would contain a volume of hydraulic fluid that may not move through the selector valve 230 as the actuator 200 extends and retracts. Moreover, these volumes would be unable to flow fully through the actuator 200, due to the piston 204 separating the extension chamber 206 from the retraction chamber 208. Therefore, these volumes would essentially be columns of hydraulic fluid that merely move backwards and forwards in the first and second hydraulic lines 216, 218, rather than be fluidically circulated around the LGERS 20. As such, in use, a large proportion of the hydraulic fluid in the LGERS 20 would not undergo sufficient motion to warm it to a degree that keeps its viscosity sufficiently low for the hydraulic fluid to flow appropriately to actuate the actuator 200 within an acceptable time period.

Figure 4:
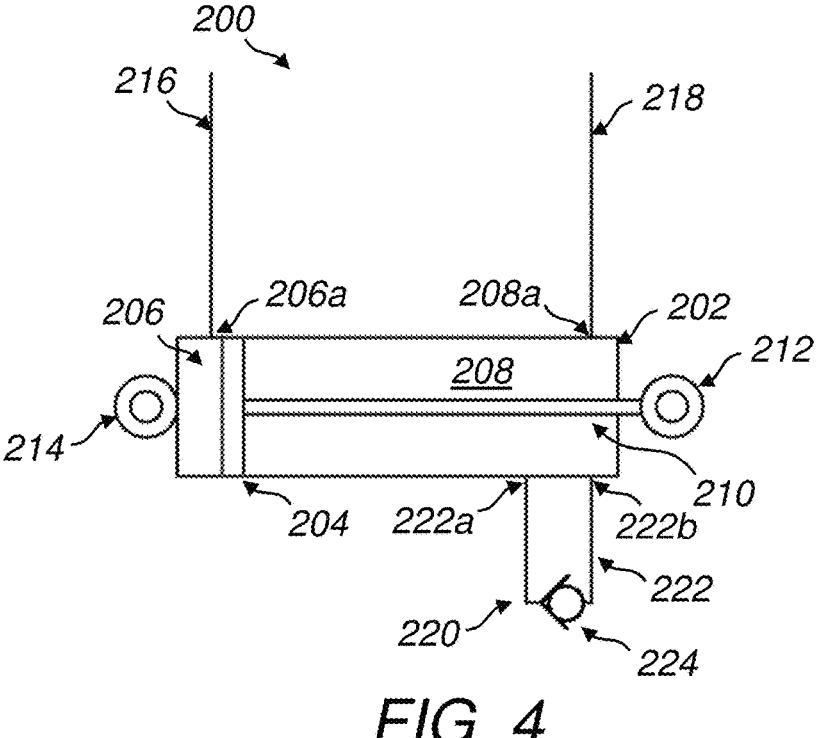
FIG. 4 shows a schematic diagram of a hydraulic actuator of the landing gear extension and retraction system of FIG. 3, in which the hydraulic actuator is fully contracted so that a piston of the hydraulic actuator is at a first end of its range of motion, which is a first position relative to a housing of the hydraulic actuator.
Figure 5:
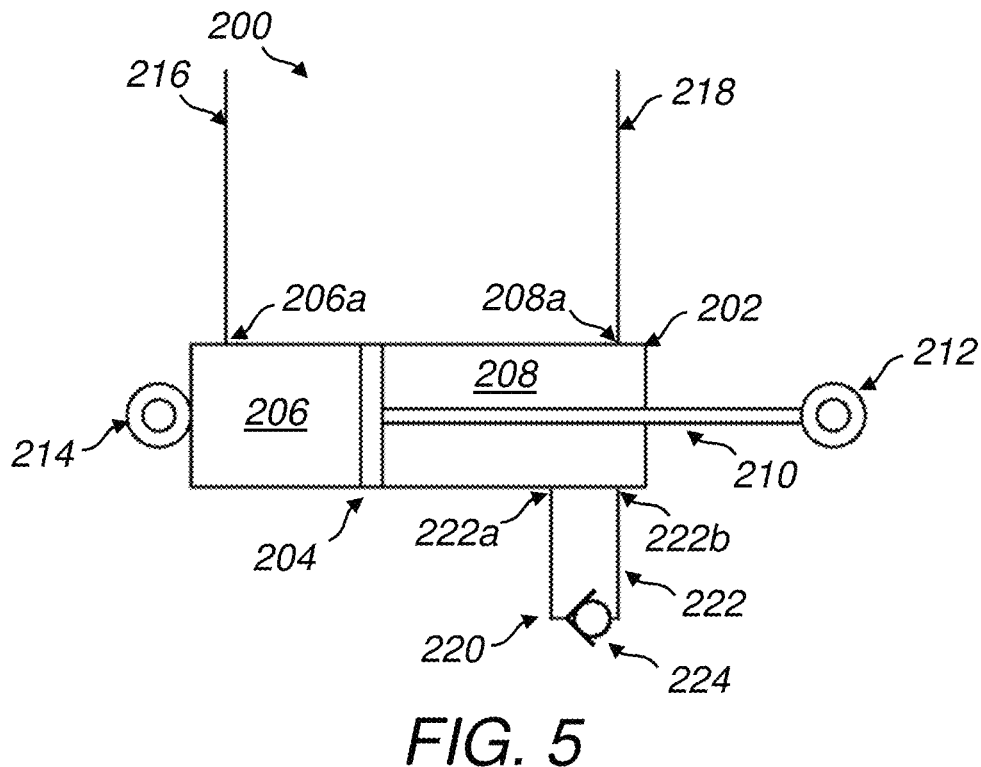
FIG. 5 shows a schematic diagram of the hydraulic actuator of FIG. 4, in which the hydraulic actuator is partially extended.
Figure 6:
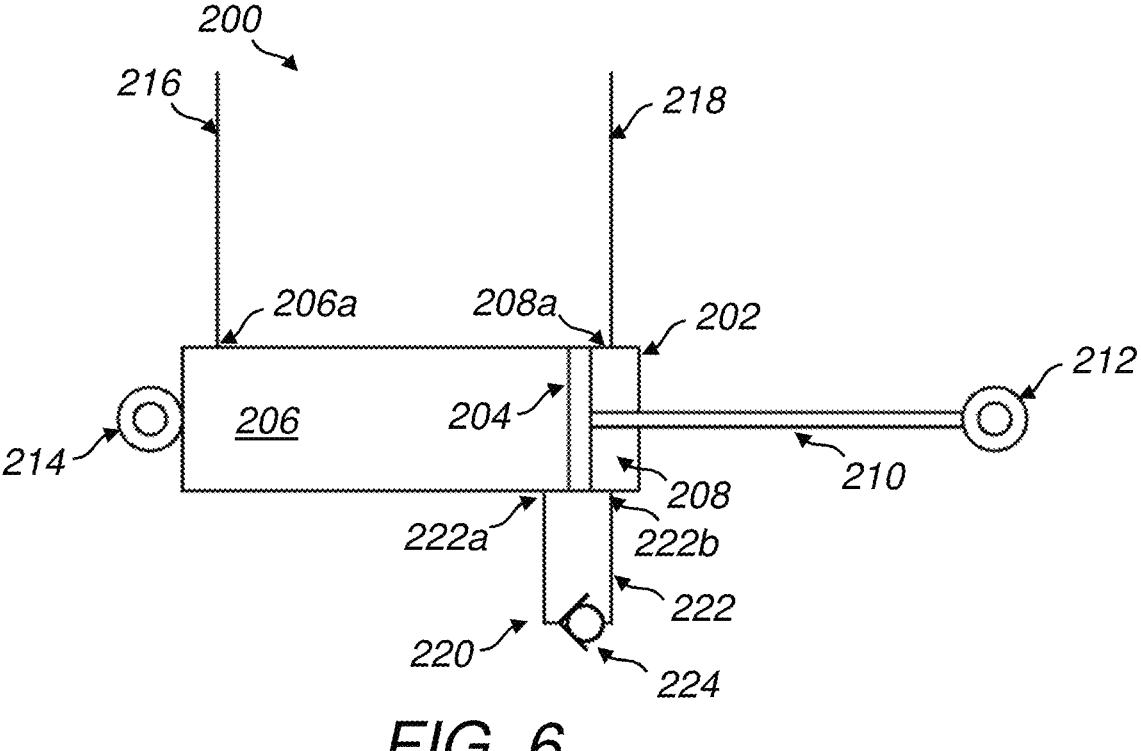
FIG. 6 shows a schematic diagram of the hydraulic actuator of FIG. 4, in which the hydraulic actuator is fully extended so that the piston is at a second end of its range of motion, which is a second position relative to the housing.

The actuator 200 will now be described in more detail, with reference to FIGS. 4 to 6.

The actuator 200 has four discrete ports in the cylindrical housing 202 that open into the cavity at respective locations. These are the only ports that open into the cavity. Of these ports, a first chamber port 206a opens into the extension chamber 206 at all possible positions of the piston 204 relative to the housing 202, and a second chamber port 208a opens into the retraction chamber 208 at all possible positions of the piston 204 relative to the housing 202. The first chamber port 206a and the second chamber port 208a are for passage of hydraulic fluid between an exterior of the actuator 200 (and, more specifically, the first and second hydraulic lines 216, 218, respectively) and the extension chamber 206 and the retraction chamber 208, respectively, to drive movement of the piston 204 relative to the housing 202 and therefore to actuate the actuator 200.

The other two ports that open into the cavity are first and second bypass ports 222a, 222b of a bypass 220 of the actuator 200. Both the first and second bypass ports 222a, 222b open into the retraction chamber 208, when the piston 204 is at a first position relative to the housing 202 so that the actuator 200 is fully contracted, as shown in FIG. 4. On the other hand, the first and second bypass ports 222a, 222b are positioned relative to each other and the cavity, and the piston 204 is suitably dimensioned and positionable, so that the first and second bypass ports 222a, 222b respectively open into the extension chamber 206 and the retraction chamber 208, when the piston 204 is at a second position relative to the housing 202 so that the actuator 200 is fully extended, as shown in FIG. 6. The second bypass port 222b is closer than the first bypass port 222a to the free end 212 of the piston rod 210, and thus is closer to an associated end of the cavity through which the piston rod 210 passes.

The bypass 220 includes a bypass line 222 that fluidly connects the first and second bypass ports 222a, 222b to each other. The bypass 220 thereby provides a fluid flow path that bypasses the piston 204, and therefore provides a system for enabling hydraulic flow through the actuator 200, and circulation of hydraulic fluid through the LGERS 20, specifically when the actuator 200 is extended and the piston 204 is therefore at the second position. In other words, when the piston 204 is at the second position, the bypass 220 provides a return path, in what would otherwise be a "dead-end" LGERS, so that hydraulic fluid is able to flow from the first hydraulic line 216 to the second hydraulic line 218 via the extension chamber 206, the bypass 220 and the retraction chamber 208 in turn. This enables heat within portions of the hydraulic fluid of the LGERS 20, such as local to the pump, to be distributed through the hydraulic fluid while the actuator 200 is extended, and thus while the main landing gear 16 is extended, as is the case when the aircraft 1 is on the ground. In turn, this enables reduction in viscosity and resistance to flow of the hydraulic fluid and, therefore, the time it takes to subsequently move the piston 204 relative to the housing 202 to retract the main landing gear 16 after take-off of the aircraft 1. Accordingly, the bypass 220 may help to reduce degradation in performance of the actuator 200 when the hydraulic fluid and/or the actuator 200 is in a cold environment.

The bypass 220 also includes a one-way valve, in the form of a check valve, 224. The check valve 224 permits fluid flow through the bypass line 222 from the first bypass port 222a to the second bypass port 222b and prevents fluid flow through the bypass line 222 from the second bypass port 222b to the first bypass port 222a. When the hydraulic fluid is to drive the piston 204 back towards the first position from the second position, the check valve 224 prevents flow of hydraulic fluid through the bypass line 222, and thus flow of hydraulic fluid through the second chamber port 208a into the retraction chamber 208 acts to move the piston 204 to retract the piston rod 210 and thereby contract the actuator 200, as described above.

Operation of the actuator 200 will now be described, with reference to FIGS. 3 to 6.

When the landing gear 16 is to be extended, the controller 260 commands the selector valve 230 to enter its first mode and commands the pump to operate, so that hydraulic fluid flows from the reservoir and through the supply line 240 towards the selector valve 230, while being warmed by the pump. This causes downstream hydraulic fluid to flow via the first hydraulic line 216 to the extension chamber 206 to cause the piston 204 to move away from the end 214 of the housing 202, and thus away from the fully contracted position of the actuator 200 shown in FIG. 4 to the position shown in FIG. 5. This movement of the piston 204 displaces hydraulic fluid in the retraction chamber 208, which therefore flows from the retraction chamber 208 and into the second hydraulic line 218. Downstream hydraulic fluid in the second hydraulic line 218 flows through the selector valve 230 and the return line 250 to the reservoir. During this initial movement of the piston 204, the first and second bypass ports 222a, 222b both open into the retraction chamber 208. Subsequent continued movement of the piston 204 away from the position shown in FIG. 4 results in the piston approaching the fully extended position of the actuator 200 shown in FIG. 6. Just before the actuator 200 reaches this fully extended position, the piston 204 passes the first bypass port 222a so that the first and second bypass ports 222a, 222b then open into the respective extension and retraction chambers 206, 208. As a result, a first portion of hydraulic fluid that subsequently flows into the extension chamber 206 from the first chamber port 206a acts on the piston 204 to continue moving the piston 204 to the position shown in FIG. 6, and a second portion of the hydraulic fluid that subsequently flows into the extension chamber 206 from the first chamber port 206a passes through the bypass line 222 to bypass the piston 204. Once the piston 204 reaches the position shown in FIG. 6, the piston 204 is at the second end of its range of motion and so it cannot move any further from the end 214 of the housing 202. Accordingly, any further hydraulic fluid that flows into the extension chamber 206 from the first chamber port 206a flows through the bypass line 222, the retraction chamber 208, and the second hydraulic line 218, back towards the reservoir. Continued operation of the pump would therefore result in a continuous flow of the hydraulic fluid through the actuator 200, so as to distribute through the hydraulic fluid heat that is within one or more portions of the hydraulic fluid.

When the landing gear 16 is subsequently to be retracted, the controller 260 commands the selector valve 230 to enter its second mode and commands the pump to operate, so that hydraulic fluid flows from the reservoir and through the supply line 240 towards the selector valve 230. This causes downstream hydraulic fluid to flow via the second hydraulic line 218 to the retraction chamber 208. As mentioned above, the check valve 224 prevents fluid flow through the bypass line 222, and so hydraulic fluid entering the retraction chamber 208 from the second chamber port 208a causes the piston 204 to move away from the position shown in FIG. 6 and towards the end 214 of the housing 202. This movement of the piston 204 displaces hydraulic fluid in the extension chamber 206, which therefore flows from the extension chamber 206 and into the first hydraulic line 216. Downstream hydraulic fluid in the first hydraulic line 216 flows through the selector valve 230 and the return line 250 to the reservoir.

Whenever the landing gear 16 is to be held in position, the controller 260 commands the selector valve 230 to enter its third mode and commands the pump to cease operating. Accordingly, no hydraulic fluid flows to, from or through the actuator 200.

It is to be noted that, in the illustrated example, the bypass line 222 is fluidly connected to the cavity by only the first and second bypass ports 222a, 222b, and the bypass line 222 is free from any junction with any other flow path. Moreover, the piston 204 is free from any passage or passages therethrough.

In the illustrated example, each of the first and second bypass ports 222a, 222b is of the same open cross-sectional area as each of the first and second chamber ports 206a, 208a. However, in other examples, one or each of the first and second bypass ports 222a, 222b may be of a different (such as smaller) open cross-sectional area to one or each of the first and second chamber ports 206a, 208a.

In the illustrated example, the bypass line 222 has an open cross-sectional area of about 3.5 mm². In some other examples, the open cross-sectional area of the bypass line 222 may be another value between 0.5 mm² and 14 mm². In some examples, the bypass line 222 includes a flow restrictor (not shown), such as a flow restrictor valve or flow control valve, that is in series with the check valve 224 and has an open cross-sectional area that is less than an open cross-sectional area of a rest of the bypass line 222. In such examples, the flow restrictor acts to restrict a rate of flow of the hydraulic fluid through the bypass line 222 in use. The open cross-sectional area of the flow restrictor may, for example, be between 0.5 mm$^2$ and 14 mm$^2$, such as about 3.5 mm$^2$. In some examples, the bypass line 222 is free from a check valve (i.e., there is no check valve in the bypass line 222). In some such examples, the open cross-sectional area of the bypass line 222 is low enough to create a pressure differential between the first and second bypass ports 222*a*, 222*b* that is sufficient to resist gross movement of fluid through the bypass line 222.

While in the illustrated embodiment the component that the actuator 200 is connected to and arranged to move is the main landing gear 16, in other embodiments the component is another part of the aircraft 1, such as a landing gear bay door, a cargo door, another landing gear, a component of a brake system, or a component of a steering system. In some examples in which the component is a landing gear bay door or a cargo door, during cold weather operation the ground crew or the controller 260 may cause the door to open (and thus the actuator 200 to extend) to enable the continuous flow of hydraulic fluid through the actuator 200 to occur. This may be done when the aircraft is on the ground or airborne. In some examples in which the component is a component of a steering system, the bypass of the actuator 200 may be located so as to bypass the piston of the actuator when the piston is at a middle of its range of motion. In other words, the second position is midway along the range of motion of the piston, rather than at an end of the range of motion of the piston.

In the illustrated embodiment, the actuator 200 has only one bypass 220, which bypasses the piston 204 when the piston 204 is at the second position relative to the housing 202. In some variations to this embodiment, the actuator also has a second bypass, which bypasses the piston only when the piston is at the first position relative to the housing. In some such variations, the second bypass comprises a second bypass line and a second one-way valve that is configured to permit fluid flow through the second bypass line from a third bypass port to a fourth bypass port and to restrict (such as prevent) fluid flow through the second bypass line from the fourth bypass port to the third bypass port. Such third and fourth bypass ports open into the cavity and are arranged so that the third bypass port is closer than the fourth bypass port to the end of the cavity through which the piston rod passes.

It is to be noted that the term "or" as used herein is to be interpreted to mean "and/or", unless expressly stated otherwise.

It should be understood that modifications, substitutions and alternatives of the invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A hydraulic actuator for a hydraulic actuation system of an aircraft, the hydraulic actuator comprising:

a housing defining a cavity configured to accommodate hydraulic fluid;

a piston within the cavity, such that the piston divides the cavity into an extension chamber and a retraction chamber, wherein the piston and that is movable relative to the housing such that, when the piston moves in a first direction, a volume of the extension chamber increases and a volume of the retraction chamber decreases and, when the piston moved in a second direction that is opposite the first direction, the volume of the extension chamber decreases and the volume of the retraction chamber increases;

a bypass comprising a first bypass port that opens into the cavity, a second bypass port that opens into the cavity, and a bypass line that fluidly connects the first bypass port to the second bypass port;

a first chamber port that is discrete from the first bypass port and from the second bypass port, wherein the first chamber port opens into the extension chamber at all positions of the piston within the cavity of the housing for passage of the hydraulic fluid between an exterior of the hydraulic actuator and the extension chamber; and a second chamber port that is discrete from the first bypass port and the second bypass port, wherein the second chamber port opens into the retraction chamber at all positions of the piston within the cavity of the housing for the passage of the hydraulic fluid between the exterior of the hydraulic actuator and the retraction chamber;

wherein, when the piston is at a first position within the cavity, the first bypass port and the second bypass port both open into the retraction chamber; and wherein, when the piston is at a second position within the cavity, the first bypass port opens into the extension chamber and the second bypass port opens into the retraction chamber.

2. The hydraulic actuator of claim 1, wherein:

the first chamber port is larger than either of the first bypass port and the second bypass port; and/or the second chamber port is larger than either of the first bypass port and the second bypass port.

3. The hydraulic actuator of claim 1, wherein the bypass comprises a one-way valve that is configured to:

permit fluid flow through the bypass line from the first bypass port to the second bypass port; and restrict fluid flow through the bypass line from the second bypass port to the first bypass port.

4. The hydraulic actuator of claim 3, wherein:

the piston is closer to an end of the cavity when the piston is at the second position than when the piston is at the first position;

the second bypass port is closer than the first bypass port to the end of the cavity; and the end of the cavity defines, at least in part, an end of the retraction chamber.

5. The hydraulic actuator of claim 1, wherein at least a portion of the bypass line has an open cross-sectional area of between 0.5 mm$^2$ and 14 mm$^2$.

6. The hydraulic actuator of claim 5, wherein the portion of the bypass line comprises a flow restrictor that is configured to restrict a rate of fluid flow through the bypass line.

7. The hydraulic actuator of claim 1, wherein the second position of the piston is at a second end of a range of motion of the piston relative to the housing.

8. The hydraulic actuator of claim 7, wherein:

the first position of the piston is at a first end of the range of motion of the piston; and the first end of the range of motion of the piston is opposite to the second end of the range of motion of the piston.

9. The hydraulic actuator of claim 1, wherein the hydraulic actuator is configured so that:

the piston is at the first position when the hydraulic actuator is fully contracted; and the piston is at the second position when the hydraulic actuator is fully extended.

10. The hydraulic actuator of claim 1, wherein only the first chamber port, the second chamber port, the first bypass port, and the second bypass port open into the cavity.

11. The hydraulic actuator of claim 1, wherein the bypass line is fluidly connected to the cavity by only the first bypass port and the second bypass port.

12. The hydraulic actuator of claim 1, wherein the bypass line is free from any junction with any other flow path.

13. A hydraulic actuation system for an aircraft, the hydraulic actuation system comprising:

the hydraulic actuator of claim 1;

a first hydraulic line fluidly connected to the first chamber port and configured to carry the hydraulic fluid to or from the extension chamber; and a second hydraulic line fluidly connected to the second chamber port and configured to carry the hydraulic fluid to or from the retraction chamber.

14. The hydraulic actuation system of claim 13, wherein the hydraulic actuation system is a landing gear system.

15. An aircraft comprising the hydraulic actuation system of claim 13.

16. A hydraulic actuator for a hydraulic actuation system of an aircraft, the hydraulic actuator comprising:

a housing defining a cavity configured to accommodate hydraulic fluid;

a piston within the cavity, such that the piston divides the cavity into an extension chamber and a retraction chamber, wherein the piston is movable relative to the housing such that, when the piston moves in a first direction, a volume of the extension chamber increases and a volume of the retraction chamber decreases and, when the piston moved in a second direction that is opposite the first direction, the volume of the extension chamber decreases and the volume of the retraction chamber increases;

a bypass comprising a first bypass port that opens into the cavity, a second bypass port that opens into the cavity, and a bypass line that fluidly connects the first bypass port to the second bypass port;

a first chamber port that is discrete from the first bypass port and from the second bypass port, wherein the first chamber port opens into the extension chamber at all positions of the piston within the cavity of the housing for passage of the hydraulic fluid between an exterior of the hydraulic actuator and the extension chamber; and a second chamber port that is discrete from the first bypass port and the second bypass port, wherein the second chamber port opens into the retraction chamber at all positions of the piston within the cavity of the housing for the passage of the hydraulic fluid between the exterior of the hydraulic actuator and the retraction chamber;

wherein, when the piston is at a first position within the cavity, the first bypass port and the second bypass port both open into:

the extension chamber; or the retraction chamber;

wherein, when the piston is at a second position within the cavity, the first bypass port opens into the extension chamber and the second bypass port opens into the retraction chamber; and wherein:

the first chamber port is larger than either of the first bypass port and the second bypass port; and/or the second chamber port is larger than either of the first bypass port and the second bypass port.

17. A hydraulic actuation system for an aircraft, the hydraulic actuation system comprising:

the hydraulic actuator of claim 16;

a first hydraulic line fluidly connected to the first chamber port and configured to carry the hydraulic fluid to or from the extension chamber; and a second hydraulic line fluidly connected to the second chamber port and configured to carry the hydraulic fluid to or from the retraction chamber.

18. A hydraulic actuator for a hydraulic actuation system of an aircraft, the hydraulic actuator comprising:

a housing defining a cavity configured to accommodate hydraulic fluid;

a piston within the cavity, such that the piston divides the cavity into an extension chamber and a retraction chamber, wherein the piston is movable relative to the housing such that, when the piston moves in a first direction, a volume of the extension chamber increases and a volume of the retraction chamber decreases and, when the piston moved in a second direction that is opposite the first direction, the volume of the extension chamber decreases and the volume of the retraction chamber increases;

a bypass comprising a first bypass port that opens into the cavity, a second bypass port that opens into the cavity, and a bypass line that fluidly connects the first bypass port to the second bypass port;

a first chamber port that is discrete from the first bypass port and from the second bypass port, wherein the first chamber port opens into the extension chamber at all positions of the piston within the cavity of the housing for passage of the hydraulic fluid between an exterior of the hydraulic actuator and the extension chamber; and a second chamber port that is discrete from the first bypass port and the second bypass port, wherein the second chamber port opens into the retraction chamber at all positions of the piston within the cavity of the housing for the passage of the hydraulic fluid between the exterior of the hydraulic actuator and the retraction chamber;

wherein, when the piston is at a first position within the cavity, the first bypass port and the second bypass port both open into:

the extension chamber; or the retraction chamber;

wherein, when the piston is at a second position within the cavity, the first bypass port opens into the extension chamber and the second bypass port opens into the retraction chamber; and wherein at least a portion of the bypass line has an open cross-sectional area of between 0.5 mm$^2$ and 14 mm$^2$.

19. The hydraulic actuator of claim 18, wherein the portion of the bypass line comprises a flow restrictor that is configured to restrict a rate of fluid flow through the bypass line.

20. A hydraulic actuation system for an aircraft, the hydraulic actuation system comprising:

the hydraulic actuator of claim 18;

a first hydraulic line fluidly connected to the first chamber port and configured to carry the hydraulic fluid to or from the extension chamber; and a second hydraulic line fluidly connected to the second chamber port and configured to carry the hydraulic fluid to or from the retraction chamber.

* * * * *